US010384631B2

United States Patent
Kesani

(10) Patent No.: US 10,384,631 B2
(45) Date of Patent: Aug. 20, 2019

(54) GUARD ASSEMBLY FOR TRUCK BODY

(71) Applicant: Caterpillar Inc., Peoria, IL (US)

(72) Inventor: Sharath Kesani, Springfield, IL (US)

(73) Assignee: Caterpillar Inc., Deerfield, IL (US)

( * ) Notice: Subject to any disclaimer, the term of this patent is extended or adjusted under 35 U.S.C. 154(b) by 136 days.

(21) Appl. No.: 15/644,926

(22) Filed: Jul. 10, 2017

(65) Prior Publication Data

US 2019/0009743 A1 Jan. 10, 2019

(51) Int. Cl.
*B60R 21/11* (2006.01)
*E02F 9/16* (2006.01)
*B60P 1/28* (2006.01)
*B60R 21/00* (2006.01)

(52) U.S. Cl.
CPC ............. *B60R 21/11* (2013.01); *B60P 1/286* (2013.01); *E02F 9/163* (2013.01); *B60R 2021/0081* (2013.01)

(58) Field of Classification Search
CPC .......... B60R 21/11; B60R 2021/0081
See application file for complete search history.

(56) References Cited

U.S. PATENT DOCUMENTS

| 3,195,250 A * | 7/1965 | Robinson | E02F 3/8152 172/272 |
| 4,111,455 A * | 9/1978 | Hickman | B60G 3/01 228/49.1 |
| 6,129,409 A | 10/2000 | D'Amico | |
| 6,935,978 B2 * | 8/2005 | Hayakawa | F16H 7/0836 474/109 |
| 7,159,344 B2 * | 1/2007 | Karhi | A61B 5/01 172/811 |
| 2011/0024143 A1 * | 2/2011 | Ditzler | E02F 3/7618 172/739 |
| 2016/0032559 A1 * | 2/2016 | Congdon | E02F 3/8152 172/701.3 |
| 2016/0168826 A1 * | 6/2016 | Dorman | E02F 3/7618 172/813 |

FOREIGN PATENT DOCUMENTS

| AU | 2003100532 | 9/2003 |
| CN | 201694083 | 1/2011 |
| CN | 204701448 | 10/2015 |
| CN | 205575489 | 9/2016 |

(Continued)

OTHER PUBLICATIONS

Teruo Matsuyama, Roof cover of forklift truck, has hard cover to open and close notch formed at hard roof board fixed to upper side of head guard, for loading and unloading battery, Mar. 31, 2005, JPO, JP 2005-82356 A, English Abstract (Year: 2005).*

(Continued)

*Primary Examiner* — James A English
(74) *Attorney, Agent, or Firm* — Oblon, McClelland, Maier & Neustadt

(57) ABSTRACT

A guard assembly for a canopy of a truck body is provided. The guard assembly includes a guard configured to be attached to the canopy. The guard includes a first surface and a second surface. The first surface includes a plurality of fins provided in a spaced apart arrangement. The fins are configured to provide structural rigidity to the guard and breakdown material contacting the first surface of the guard.

14 Claims, 5 Drawing Sheets

(56) References Cited

FOREIGN PATENT DOCUMENTS

| EP | 2511225 | | 1/2014 |
|----|---------|---|--------|
| EP | 1473189 | | 12/2016 |
| JP | 2005082356 A | * | 3/2005 |
| WO | 2015010156 | | 1/2015 |

OTHER PUBLICATIONS

Teruo Matsuyama, Roof cover of forklift truck, has hard cover to open and close notch formed at hard roof board fixed to upper side of head guard, for loading and unloading battery, Mar. 31, 2005, JPO, JP 2005-82356 A, Machine Translation of Description (Year: 2005).*

Meilong et al., Carriage for motorized wheel dump trucks, Jan. 5, 2011, EPO, CN 201694083 U, Machine Translation of Description (Year: 2011).*

Wang et al., Large-tonnage natural gas loader gas cylinder protection machanism, Oct. 14, 2015, EPO, CN 204701448 U, Machine Translation of Description (Year: 2015).*

* cited by examiner

GUARD ASSEMBLY FOR TRUCK BODY

TECHNICAL FIELD

The present disclosure relates to a guard assembly, and more particularly to the guard assembly for a truck body of a machine.

BACKGROUND

Machines, such as trucks, have a truck body to carry material from one location to another. A canopy extends from the truck body. Guards are attached to the canopy to deflect the material from falling on to a walking area near or on the machine and prevent damaging any other attachments of the machine for example, mirrors, muffler tips, etc.

The guards are generally attached to the canopy by welding. During operation, material may fall on the guards, causing the guards to get damaged. However, since the guards are attached to the canopy by welding, it may be difficult to remove and replace the guards. Further, removal of the guards may be a laborious and time-consuming process, affecting overall productivity of the system.

Australian Published Application Number 2003100532 describes a road header machine including a movable carriage, a boom extending from and mounted at one end of the carriage for sweeping movement through vertical and horizontal axes. A cutting head is mounted to an opposite end of the boom for rotation, while a roof guard is mounted to the carriage and movable from a withdrawn position to an operative position. In the operative position, the guard is positioned closely adjacent to, or in contact with the roof of the excavated tunnel to support the tunnel roof or walls from fragmentation or collapse above or adjacent the roof guard.

SUMMARY OF THE DISCLOSURE

In one aspect of the present disclosure, a guard assembly for a canopy of a truck body is provided. The guard assembly includes a guard configured to be attached to the canopy. The guard includes a first surface and a second surface. The first surface includes a plurality of fins provided in a spaced apart arrangement. The fins are configured to provide structural rigidity to the guard and breakdown material contacting the first surface of the guard.

In another aspect of the present disclosure, a machine is provided. The machine includes an engine, a truck body having a canopy, and a guard assembly for the canopy. The guard assembly includes a guard attached to the canopy. The guard includes a first surface and a second surface. The first surface includes a plurality of fins provided in a spaced apart arrangement. The fins are configured to provide structural rigidity to the guard and breakdown material contacting the first surface of the guard.

Other features and aspects of this disclosure will be apparent from the following description and the accompanying drawings.

DETAILED DESCRIPTION

Wherever possible, the same reference numbers will be used throughout the drawings to refer to the same or the like parts. Also, corresponding or similar reference numbers will be used throughout the drawings to refer to the same or corresponding parts.

Figure 1:
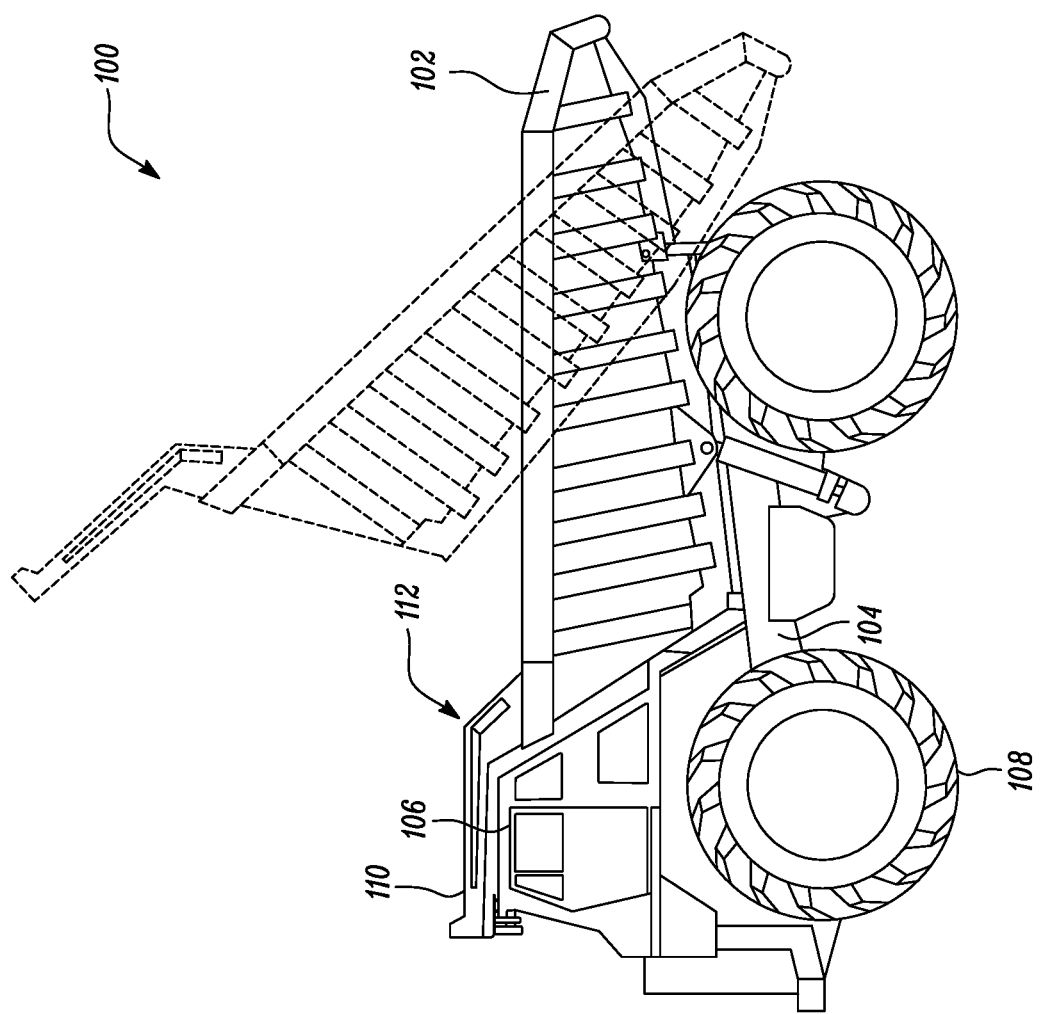
FIG. 1 is a side view of an exemplary machine, according to various concepts of the present disclosure.

Referring to FIG. 1, an exemplary machine 100 is illustrated. The machine 100 is embodied as a dump truck. The machine 100 includes a truck body 102 pivotably attached to a frame 104 of the machine 100. Although the machine 100 is illustrated as an off-highway truck, those skilled in the art will appreciate that the machine 100 may be any other known machine having a canopy.

The machine 100 has an operator cabin 106 housing controls to operate the machine 100. Wheels 108 are provided on the machine 100 for mobility. During operation, the truck body 102 pivots about a pair of pivot pins when moving from a first position, as shown, towards a second position as shown in shadow. This movement of truck body 102 is controlled by one or more actuators.

Figure 2:
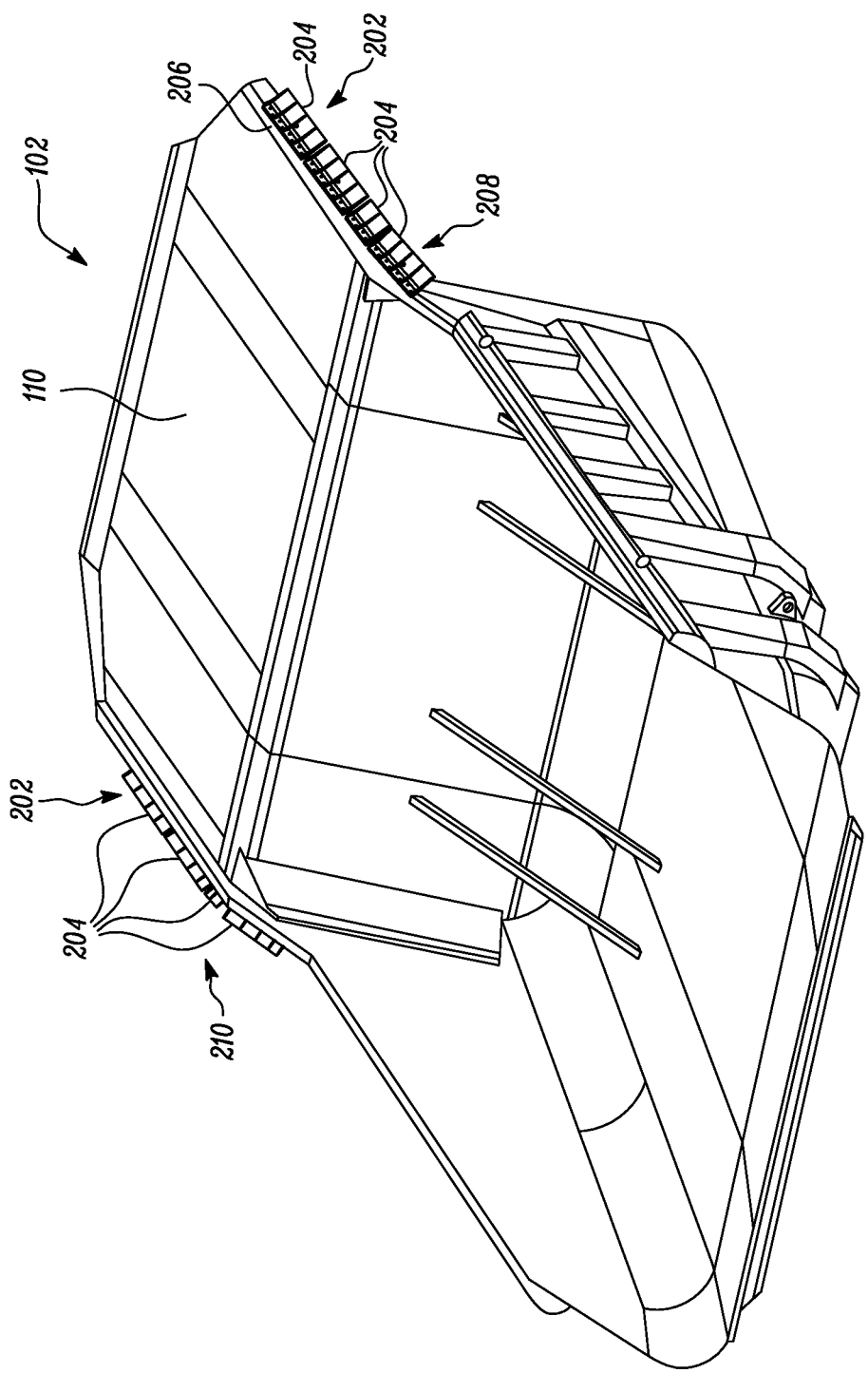
FIG. 2 is a perspective view of truck body of the machine, according to various concepts of the present disclosure.

The truck body 102 is configured to be loaded with material, and the machine 100 transports the material from one location to another for dumping. For example, the truck body 102 may be loaded with the material when the truck body 102 is in the first position. After moving to the dumping location, the truck body 102 may be actuated to move to the second position for dumping the material. Referring to FIGS. 1 and 2, a canopy 110 extends from a front portion 112 of the truck body 102. The canopy 110 may protect the operator cabin 106 from the material and other objects, as the truck body 102 is filled with the material when in the first position.

The present disclosure relates to a guard assembly 202 (see FIG. 2) for the canopy 110 of the truck body 102. The guard assembly 202 includes a number of guards 204. The guards 204 are provided on an outer edge 206 of the canopy 110 of the truck body 102. A number of the guards 204 may be attached to the canopy 110. In the illustrated embodiment, four of the guards 204 are shown attached to each of a first side 208 and a second side 210 of the canopy 110. The guards 204 are placed side-by-side each other on the outer edge 206 of the canopy 110. Alternatively, the number and location of guards 204 connected to the canopy 110 may vary.

Figure 3:
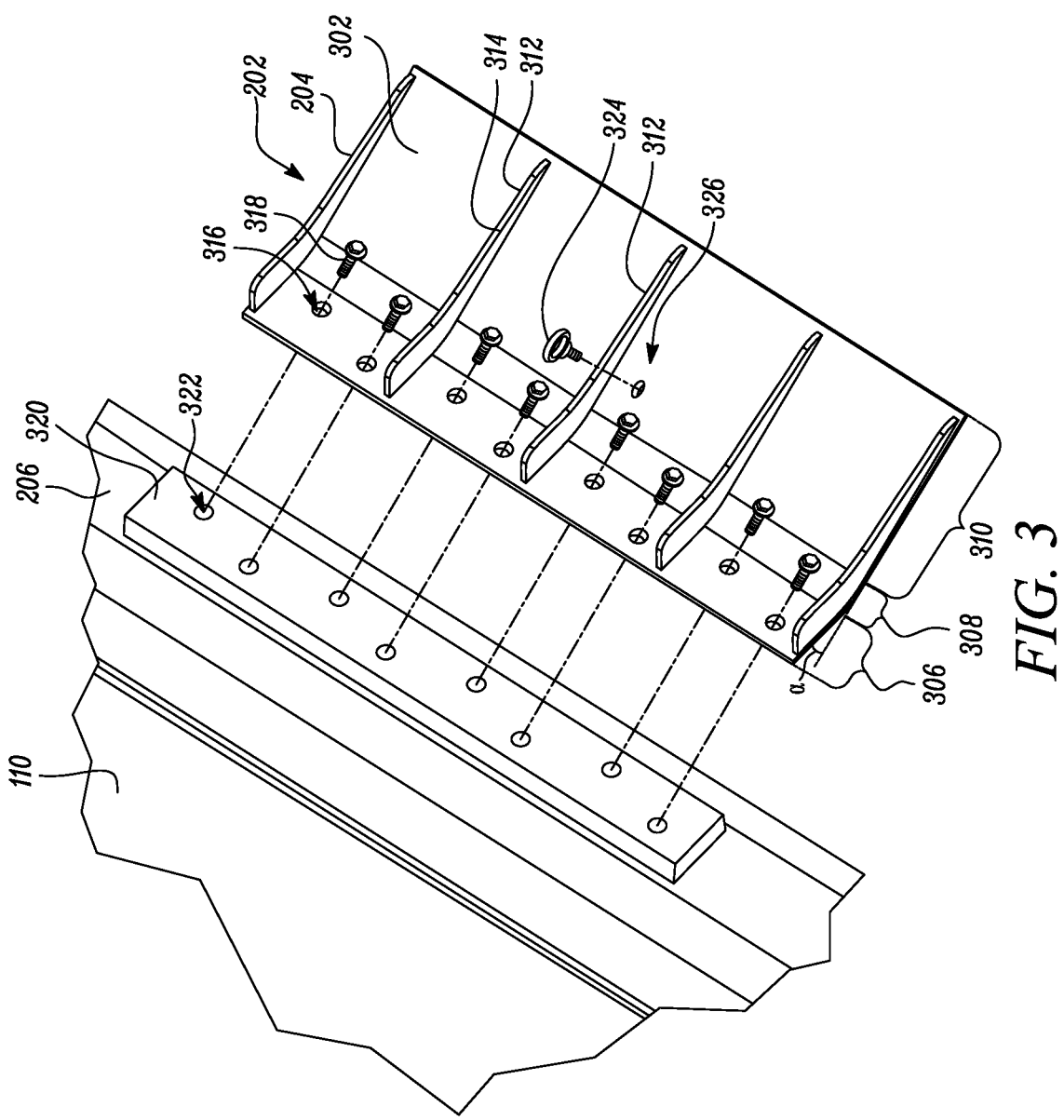
FIG. 3 is a perspective exploded view of a guard assembly of the machine, according to various concepts of the present disclosure.
Figure 4:
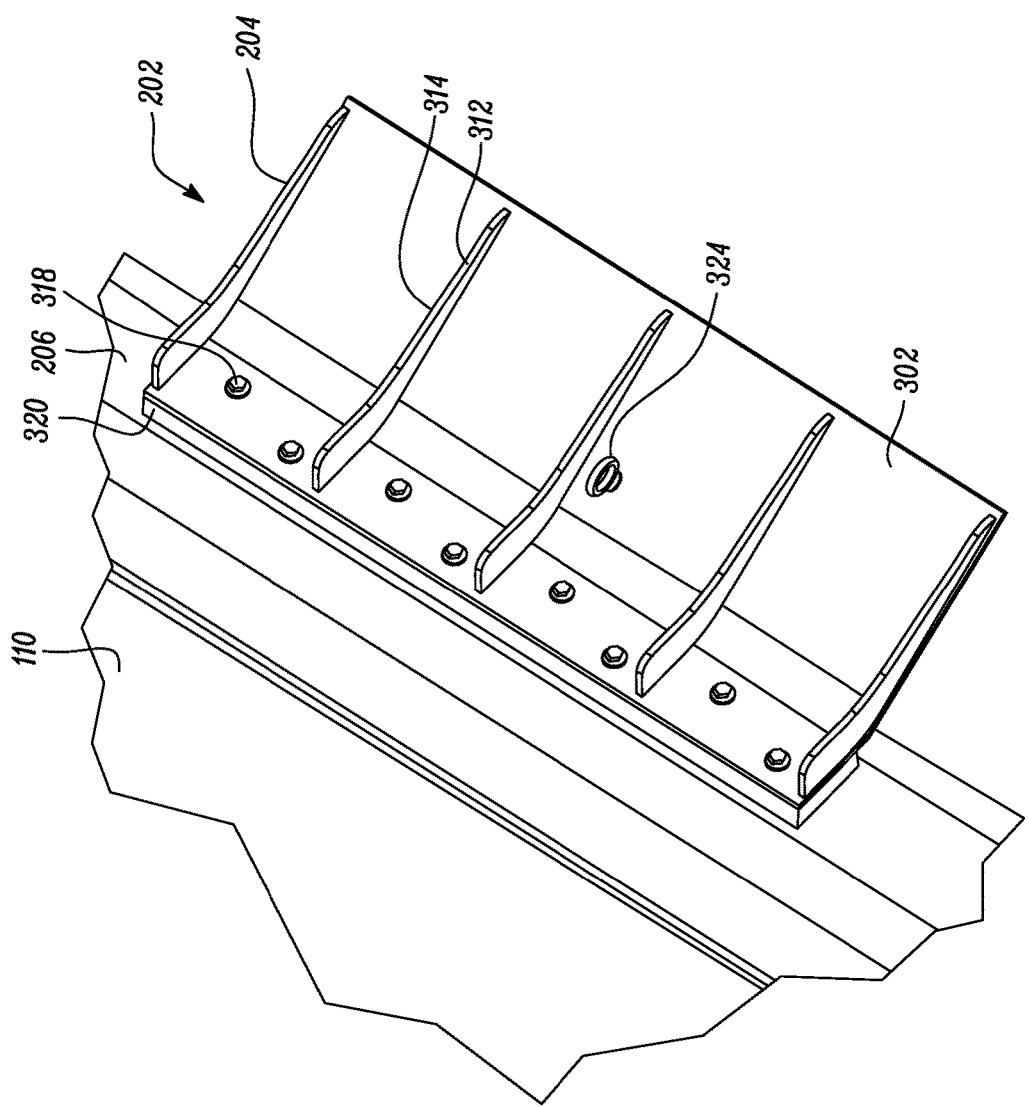
FIG. 4 is a top view of the guard assembly, according to various concepts of the present disclosure.
Figure 5:
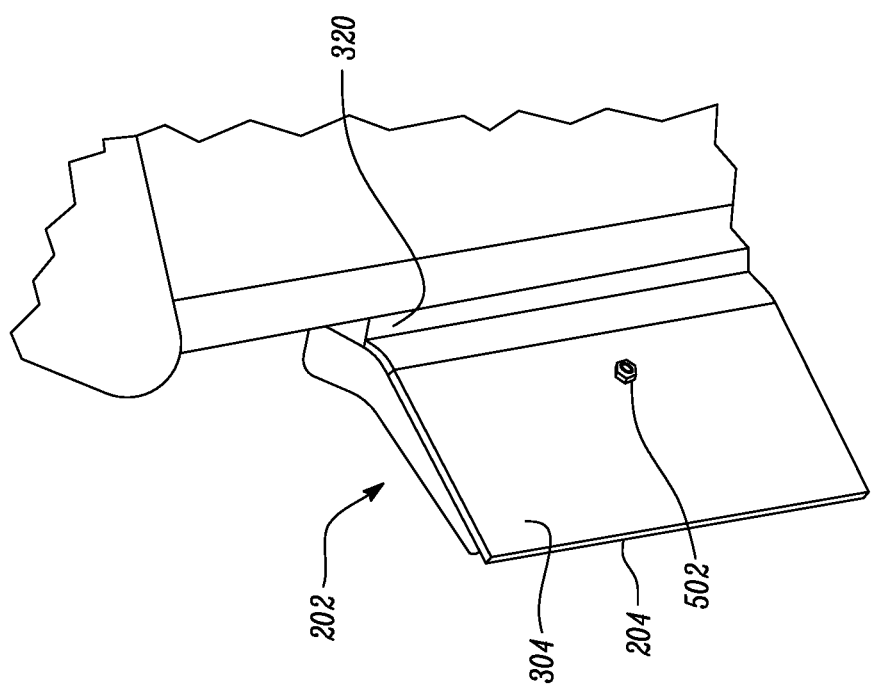
FIG. 5 is a bottom view of the guard assembly, according to various concepts of the present disclosure.

Referring to FIGS. 3 to 5, each of the guards 204 has a first surface 302 and a second surface 304 (see FIG. 5). When installed on the machine 100, the first surface 302 faces away from the ground and the second surface 304 faces the ground. The guard 204 has a bent configuration. More particularly, the guard 204 has a first portion 306, an intermediate curved portion 308, and a second portion 310. The second portion 310 extends from the intermediate curved portion 308. The first portion 306 is disposed at an angle α relative to the second portion 310. In some examples, the angle α may lie between 30 and 70 degrees. When attached to the canopy 110, the guard 204 is installed such that the second portion 310 projects upwards and away from the ground.

The first surface 302 of the guard 204 has a number of fins 312. The second surface 304 of the guard 204 is relatively flat. The fins 312 extend from the first portion 306 through the intermediate curved portion 308, and towards the second portion 310. The fins 312 are provided in a spaced apart arrangement. In one example, the guard 204 includes five of the fins 312. Alternatively, the number of the fins 312 may vary based on a length of the guard 204. The length of the guard 204 in turn may vary based on a length or shape of the outer edge 206 of the canopy 110 to which the guard 204 is attached to. Further, a width of the each of the fins 312 tapers along a length of the respective fin 312, such that the width of the fin 312 decreases in dimension from the first portion 306 towards the second portion 310.

The fins 312 are configured to provide structural rigidity to the guard 204 and breakdown any material that may contact the fins 312. For example, when material is being loaded into the truck body 102, material having a relatively large size may fall onto the fins 312 of the guard 204. On contact with the fins 312 of the guard 204, a raised edge 314 of each of the fins 312 may cause the material to breakdown into smaller pieces, and then allow the smaller particles of the material to slide down the second portion 310 of the guard 204 towards the ground.

The guard 204 can be easily attached to and disassembled from the outer edge of the plate 320 of the canopy 110. The first portion 306 of the guard 204 includes a number of apertures 316. The apertures 316 are provided in a spaced apart arrangement from each other. The apertures 316 are configured to receive mechanical fasteners 318, for example bolts. The guard 204 is configured to be attached to a plate 320. The plate 320 includes corresponding holes 322 for receiving the mechanical fasteners 318. The plate 320 is attached to the outer edge 206 of the canopy 110 by any known attachment means. For example, the plate 320 may be welded to the canopy 110. In another example, the holes 322 on the plate 320 may be embodied as through holes, such that the mechanical fasteners 318 pass through the guard 204 and the plate 320, attaching the guard 204 to the plate 320 and the plate 320 to the canopy 110.

Further, a hook 324 is provided on central portion 326 of the first surface 302 of the guard 204. A weld nut 502 may be provided on the second surface 304 for tightening the hook 324 in position. The hook 324 may be used to place the guard 204 in position for assembly. In some embodiments, a cover element (not shown) may be provided on the second surface 304 of the guard 204. The guard 204 may be made from any suitable metal. Although, the guard 204 is shown attached to the canopy 110 such that the first surface 302 faces away from the ground, in other embodiments, the guard 204 may be installed such that the first surface 302 of the guard 204 faces the ground. In this case, the fins 312 may act as reinforcement members, providing strength and rigidity to the guard 204.

INDUSTRIAL APPLICABILITY

The present disclosure provides a robust, cost effective, and easy solution for attaching the guards 204 to the canopy 110 of the truck body 102. The fins 312 provided on the guard 204 provides structural rigidity to the guard 204 and assist in breaking the material that may fall onto the guard 204. The angled and bent shape of the guard 204 allows the material falling on the guard 204 to rollover onto the ground. The bolt-on design of the guards 204 makes installation and removal of the guards 204 an easy process, allowing for ease in serviceability and replacement. Hence, the guards 204 may be easily replaced, saving time and thereby improving efficiency and productivity of the machine 100.

While aspects of the present disclosure have been particularly shown and described with reference to the embodiments above, it will be understood by those skilled in the art that various additional embodiments may be contemplated by the modification of the disclosed machines, systems and methods without departing from the spirit and scope of what is disclosed. Such embodiments should be understood to fall within the scope of the present disclosure as determined based upon the claims and any equivalents thereof.

What is claimed is:

1. A guard assembly for a canopy of a truck body, the guard assembly comprising:
   a guard configured to be removably attached to the canopy,
   wherein the guard includes a top surface and a bottom surface opposite the top surface,
   wherein the top surface includes a plurality of fins provided in a spaced apart arrangement, the fins providing structural rigidity to the guard and being configured to breakdown material prior to the material contacting the top surface of the guard,
   wherein the guard has a bent configuration, including a first portion, an intermediate curved portion, and a second portion extending from the intermediate curved portion,
   wherein the first portion is disposed at an angle relative to the second portion,
   wherein the first portion of the guard includes a plurality of apertures, the plurality of apertures configured to receive mechanical fasteners therethrough to removably attach the guard to the canopy such that the top surface faces upward, the bottom surface faces downward, and the second portion of the guard extends upward and away from the ground,
   wherein a first fin of the plurality of fins is provided at a first end of the guard, a second fin of the plurality of fins is provided at a second end of the guard opposite the first end, and
   wherein the first and second fins, the intermediate curved portion, and the first portion and the second portion define an inner volume of the guard.

2. The guard assembly of claim 1, wherein the angle formed between the first and second portions lies between 30 and 70 degrees.

3. The guard assembly of claim 1, wherein each of the plurality of fins extends from the first portion, through the intermediate curved portion, and towards the second portion of the guard.

4. The guard assembly of claim 1, wherein a width of each of the plurality of fins tapers along a length of the fin, decreasing in dimension from the first portion towards the second portion.

5. The guard assembly of claim 1, wherein the first portion of the guard is configured to be attached to a plate by the mechanical fasteners, the plate being connected to the canopy of the machine.

6. The guard assembly of claim 5, wherein the plate is welded to the canopy.

7. The guard assembly of claim 5, wherein the plate includes a plurality of holes for receiving the mechanical fasteners therethrough, such that the plate and the guard are connected to the canopy by the mechanical fasteners.

8. The guard assembly of claim 1, wherein the guard further includes a hook attached to the top surface of the guard.

9. The guard assembly of claim 8, wherein the hook is positioned at a central portion of the guard.

10. The guard assembly of claim 1, wherein the bottom surface of the guard has a flat configuration.

11. The guard assembly of claim 1, further comprising a plurality of said guards, wherein a number of the guards are arranged in a side-by-side arrangement on an outer edge of the canopy.

12. The guard assembly of claim 1, wherein a number of the plurality of fins on the guard varies based on a length of the guard.

13. The guard assembly of claim 1, wherein the guard is made of metal.

14. A machine comprising:
- an engine;
- a truck body having a canopy; and
- a guard assembly for the canopy, the guard assembly comprising:
  - a guard removably attached to the canopy,
  - wherein the guard includes a top surface and a bottom surface opposite the top surface,
  - wherein the top surface includes a plurality of fins provided in a spaced apart arrangement, the fins providing structural rigidity to the guard and being configured to breakdown material prior to the material contacting the top surface of the guard,
  - wherein the guard has a bent configuration, including a first portion, an intermediate curved portion, and a second portion extending from the intermediate curved portion,
  - wherein the first portion is disposed at an angle relative to the second portion,
  - wherein the first portion of the guard includes a plurality of apertures, the plurality of apertures configured to receive mechanical fasteners therethrough to removably attach the guard to the canopy such that the top surface faces upward, the bottom surface faces downward, and the second portion of the guard extends upward and away from the ground,
  - wherein a first fin of the plurality of fins is provided at a first end of the guard, a second fin of the plurality of fins is provided at a second end of the guard opposite the first end, and
  - wherein the first and second fins, the intermediate curved portion and the first portion and the second portion define an inner volume of the guard.

* * * * *